United States Patent [19]

Black et al.

[11] Patent Number: 5,382,770
[45] Date of Patent: Jan. 17, 1995

[54] MIRROR-BASED LASER-PROCESSING SYSTEM WITH VISUAL TRACKING AND POSITION CONTROL OF A MOVING LASER SPOT

[75] Inventors: Michael Black, Foster City; Vladimir Kupershmidt, Pleasanton, both of Calif.

[73] Assignee: Reliant Laser Corporation, Foster City, Calif.

[21] Appl. No.: 4,709

[22] Filed: Jan. 14, 1993

[51] Int. Cl.⁶ .......................................... B23K 26/00
[52] U.S. Cl. .... 219/121.63; 219/121.74.121.78.121.83
[58] Field of Search ...................... 219/121.63, 121.64, 219/121.74, 121.75, 121.78, 121.79, 121.83

[56] References Cited

U.S. PATENT DOCUMENTS 5,128,509 7/1992 Black et al. ............... 219/121.76

Primary Examiner—C. L. Albritton

[57] ABSTRACT

A mirror-based laser processing system, e.g., for laser welding, provided with manual control of movements of a laser welding spot W on an object O being treated. The system includes a laser source (10) which generates a laser beam capable of treating the object (O), a mirror-based micromanipulator (14) which consists of a concave mirror (18) and a convex mirror (16) facing each other, and a laser beam splitter (20) which is located on the path of the laser beam reflected from the concave mirror (18). The laser beam splitter (20) has a coating which reflects the laser beam onto the object (O), but is capable of passing visible and infrared light. Movements of the laser-beam splitter are manually controlled from an external terminal, which is made in the form of a joy stick (50). The joy stick is capable of moving the laser welding spot (W) in any direction over the object's surface in the X-Y coordinate system. Adjustment in the Z-axis direction is performed through a zoom system of the mirror-based micromanipulator (14). The infrared light which is generated by the heated area of the object passes through the laser-beam splitter which transmits visible light to the microscopic head for observation of the object and reflects the infrared light. The latter is processed by a processing unit (38) and is converted into visible thermal information presented on a display (46) in the form convenient for manual control of the position of the welding spot W.

10 Claims, 3 Drawing Sheets

MIRROR-BASED LASER-PROCESSING SYSTEM WITH VISUAL TRACKING AND POSITION CONTROL OF A MOVING LASER SPOT

BACKGROUND—FIELD OF THE INVENTION

The present invention relates to the field of laser processing, particularly to a mirror-based laser-processing system, e.g., a laser welding system, with visual tracking and position control of the moving welding spot.

BACKGROUND—DESCRIPTION OF PRIOR ART

In recent years, the process of laser processing, i.e., cutting or welding with the use of a laser beam, has found numerous practical applications in various fields such as manufacturing of semiconductors, dies, or fine engraving in metals, etc.

In mass production, welding processes are automated and do not require active visual control. However, in experimental and custom-design manufacturing, which are characterized by individual or small-batch orders, the use of a specially-designed active-control system is economically unjustifiable, and therefore manual active control is often required.

Recently, the use of television direct monitoring has been increased. All of the methods of directly monitoring the arc-welding area with a television camera have involved the attempts to duplicate what the actual view received by the welding operator. For this purpose, a viewing camera has been placed in such a position as to have an oblique view of the welding procedure, similarly to the view enjoyed by the operator. Such an oblique-viewing system is described, e.g., in U.S. Pat. No. 4,532,404, issued 1985 to Boillot et al. The oblique viewing of the welding procedure is inherently flawed since the area around the welding spot, which is very bright, is also viewed. This brightness destroys the entire picture unless appropriate filters are used. Therefore, the existing methods of obliquely viewing the weld and the welding-spot area also involve filtering the image through one or several discrete wavelengths of light, rather than viewing the broad spectrum of light that is available from the welding spot.

U.S. Pat. No. 4,532,408 issue July 195 to R. Richardson describes an optical apparatus for viewing a welding process wherein the view angle is directed parallel to and around the electrode, thus allowing the electrode tip to block the welding spot from direct view. The light seen is reflected from the mirror-like molten pool, revealing the edge of the pool which is a parameter directly analyzed by video picture analysis to control the welding process.

However, the system described in the abovementioned patent is a lens-based optical system which is designed only for a predetermined wavelength of the transmitted light. Furthermore, such a system poorly transmits UV light, is very expensive, and cannot be used for low-energy applications, such as treating low-melting-point materials.

The above disadvantage can be obviated by utilizing mirror-based systems which are capable of efficiently transmitting UV light. An example of such a system is an apparatus of U.S. Pat. No. 4,315,130 issued in 1982 to M. Inagaki, et al. In the Inagaki apparatus, a laser beam which is emitted from a laser source is divided into a plurality of fractional laser beams. The latter are irradiated toward the object being treated after being compounded such that the energy density distribution on the irradiated area is made substantially uniform in at least one direction. This allows a uniform treatment. However, the Inagaki system is characterized by significant astigmatic aberration, thus making it impossible to perform precise profile treatment operations with welding spots having micron dimensions. Moreover, the mirror-based system of U.S. Pat. No. 4,315,130 is not suitable for any active control. This system has a laser spot in a fixed position and does not allow scanning of the object.

Furthermore, U.S. Pat. No. 4,532,404 describes a system which allows to carry out temperature control of the welding spot by means of a thermal sensor of a photo-electric type. The use of such a sensor, however, does not provide a thermal image of the treatment area and makes it impossible to obtain a thermal distribution pattern around the area of the welding spot. This is because the abovementioned sensor detects the integral thermal energy and does not differentiate between the points of the temperature pattern.

OBJECTS AND ADVANTAGES OF THE INVENTION

It is therefore an object of the invention to eliminate the above disadvantages and to provide a mirror-based laser-welding system with visual tracking and controlling positions of the moving laser spot which is simple in construction, inexpensive to manufacture, is free of complicated filters, does not depend on high temperatures in the vicinity of the laser spot being observed, is applicable for laser beams of any wavelength, is suitable for low-energy applications and for treating low-melting-point materials such as plastics, allows precise profile treatment operations on a submicron level, and allows to obtain a thermal distribution pattern around the area being treated.

Other advantages and features of the invention will become apparent from a consideration of the ensuing description and drawings.

DETAILED DESCRIPTION OF THE APPARATUS OF THE INVENTION

In general, a system of the present invention is designed for treating, e.g., welding or cutting objects which have irregular patterns and are produced individually or in a very small batches, i.e., when programming is costly, time consuming, and not flexible.

Figure 1:
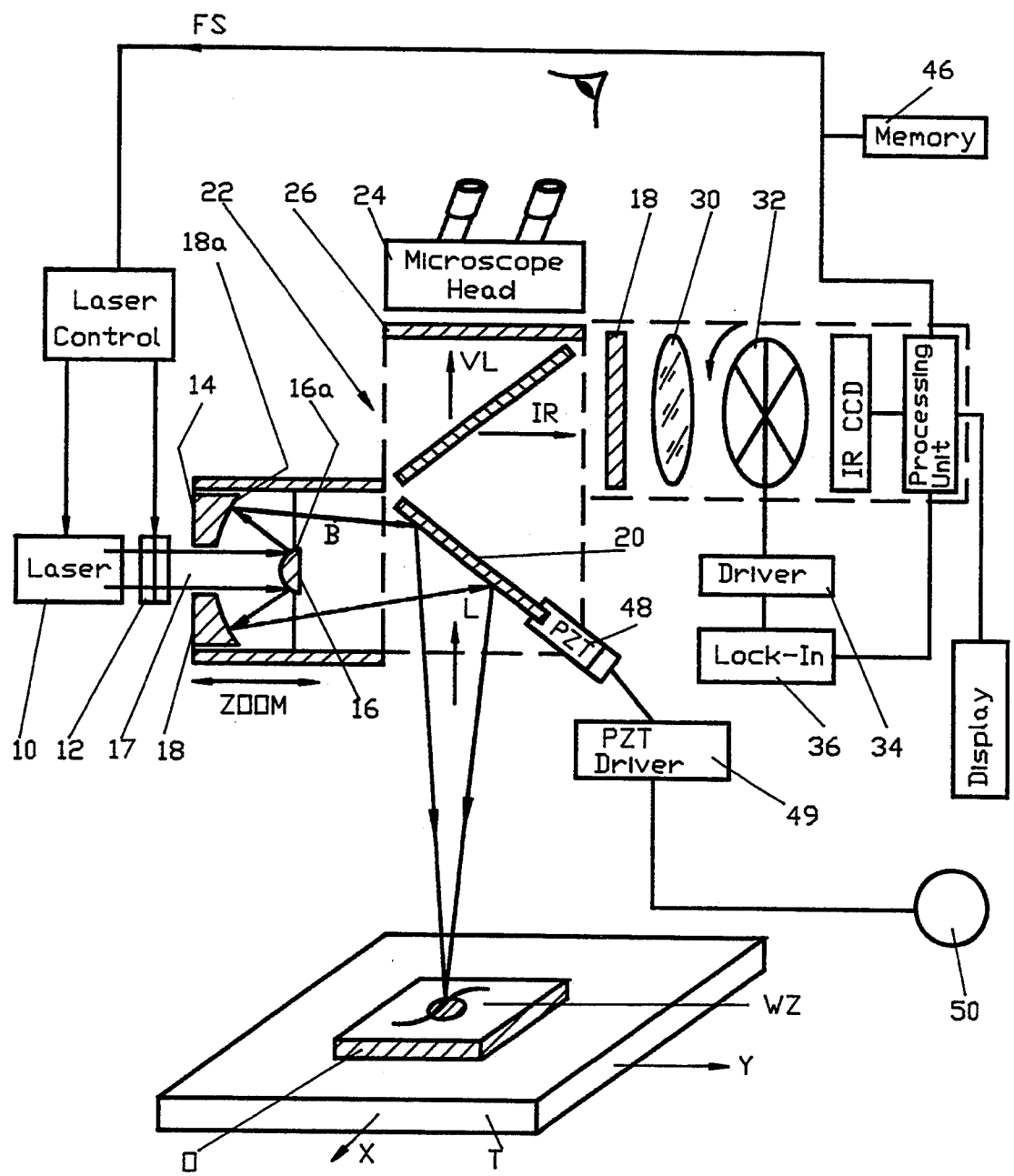
FIG. 1 is a general schematic view of the laser welding system of the invention with manual control from a joystick.

An example of a laser welding system of the invention is shown in FIG. 1 which is a general schematic view of this system with manual control from a joystick and with parts of the system's elements represented three-dimensionally.

As much as possible, the elements of the laser welding system will be described in the direction of propagation of a laser beam. Where the beam is split, each subsystem will be described sequentially.

In the illustrated example, the system contains a laser source 10 of any type suitable for laser welding. Examples of such sources are an Nd:YAG-type, eximer-type, and an $CO_2$ laser source which are produced by many companies, e.g., by Coherent, Inc., California.

On its output end, laser source 10 has a laser shutter 12 which controls the duration and the repetition rate of a laser beam B emitted from source 10. The operation of laser shutter 12 is controlled remotely through a feedback loop from the treatment area, which will be described later. Laser source 10 may generate a visible aiming beam (not shown) which is used for preliminarily aligning and focusing of the laser unit prior to the generation of the power beam.

The next unit in the direction of propagation of laser beam B from source 10 is a mirror-type laser micromanipulator 14 which is located between a laser source 10 and a wavelength-selective beam-splitter system 20.

Mirror-type laser micromanipulator 14 consists of a cylindrical housing 15 which holds two coaxially-arranged aspherical mirrors, i.e., a small-diameter convex mirror 16, a convex front surface 16a of which faces incident laser beam B emitted from source 10, and a large-diameter concave mirror 18 which has a central opening 17 for passing a laser beam toward mirror 16. Mirror 18 has its concave front surface 18a facing convex front surface 16a of mirror 16. Micromanipulator 14 has a zoom system 19 which may comprise an outer thread on the outer surface of housing 15 and an inner thread on the inner surface of a ring 19, so that by rotating ring 19 it is possible to change a focusing distance of micromanipulator 14 by changing the distance between mirrors 16 and 18 in response to the variation of the operation conditions, such as the different dimensions of an object O being treated, different magnification factors, different microscope heads, etc.

The above-described mirror-based system ensures that the aiming beam and the processing beam are focused at the same point on object O with absolute accuracy. This results from the nature of the mirror system itself and cannot be achieved with the use of a lens system.

A similar mirror-type laser delivery system is used in laser microsurgery and is described in earlier Applicant's U.S. Pat. No. 5,128,509.

Laser beam B, received by mirror 16, is reflected in a diverging manner toward mirror 18, which, in turn reflects it in a converging manner towards a laser beam splitter 20. The latter comprises a plain-parallel plate with a special wavelength-selective coating. This coating possesses a high reflectivity and a high damage threshold with respect to the working laser wavelength and therefore reflects the incident laser beam B toward the treatment area of object O. On the other hand, the same coating is highly permeable to visible VL and infrared IL lights, which have wavelengths significantly different from those of the laser beam. As a result, laser beam B will be reflected onto the object for treating, e.g., welding the object, while image components (VL and IL) will be transmitted through beam splitter 20 for further use in the formation of a visible image and an infrared image. The reflected laser beam B is focused at a point of treatment, e.g., at a welding spot W on the surface of object O. Beam splitters 20 of the type described above can be produced, e.g., by OCLI Corp., Santa Rosa, Calif.

Located on the side of beam splitter 20 opposite to object O is an imaging beam splitter 22 which also is made in the form of a plane-parallel plate having a special coating (not shown) which transmits visible light VL and reflects infrared light IL. A splitter of this type also can be produced by OCLI Corp.

Visible light VL is directed to a changeable microscope head 24 through a visible-light filter 26 which passes only visible components of the spectrum. Microscopic head 24 can be focused onto object O and used for initial positioning of laser spot W on object O.

Infrared light IL is directed through a sequence of optical elements which form an infrared tracking system with electron control and which are described below. The first element of this system in the direction of propagation of the infrared light is an infrared filter 28 which passes the light corresponding only to the infrared part of the spectrum and also blocks the laser infrared wavelengths used for treating an object. Located behind filter 28 is an infrared objective lens 30 which forms an infrared thermal image of object O. Next element in the optical path is a chopper 32 which is controlled by a driver 34 connected to one input of a lock-in amplifier 36. Chopper 32 converts continuous infrared light into a discrete-pulse sequence which is then used, in a conventional manner, for subtracting the background infrared light, as is known in the art.

Another input of the lock-in amplifier is connected to an output of a processing unit 38 which is built on the basis of conventional IC circuits and processes electrical-signal data into a visible image on a display.

The second output of the processing unit is connected to the input of a laser controller 40 which is designed to stabilize the power supplied to laser source 10 and controls through a feedback loop FS the operation of laser shutter 12, in response to the changes in the temperature of object O. Data on temperature variation is generated by processing unit 38, which receives the temperature-variation input data from infrared charge-coupling devices (IR CCD) 42, located between chopper 32 and processing unit 38 and converts incident infrared light which carries thermal image information into electrical signals. This makes it possible to obtain a thermal distribution pattern (not shown) which, in fact, is a thermal image of object O during the treatment.

Processing unit 38 is connected to a memory unit 44 which stores thermal images received from processing unit 38 and contains an algorithm which uses the obtained thermal data for converting it into temperature data. These data is compared with a predetermined threshold for a given object for feedback control.

Figure 2A:
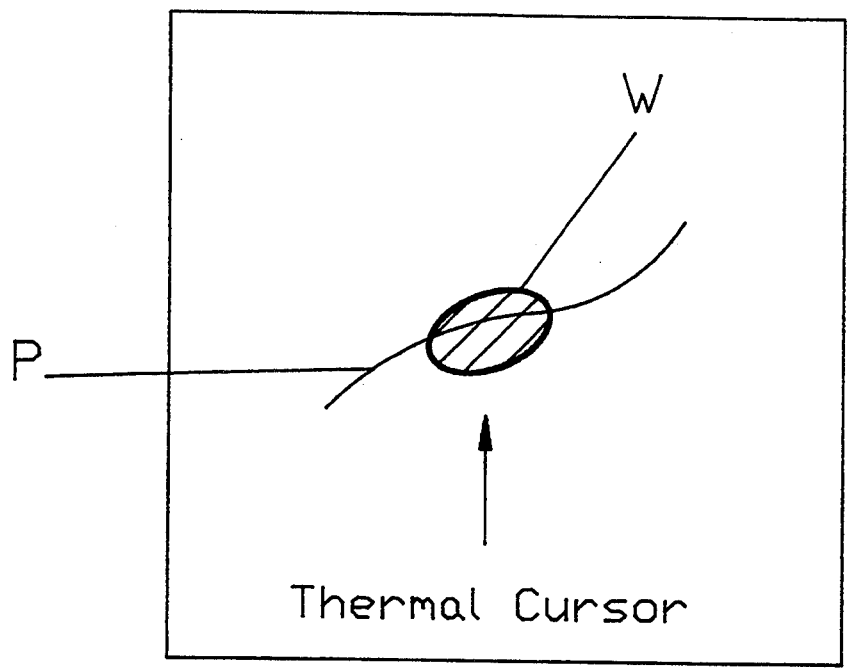
FIG. 2A is a thermal image and the position of a thermal cursor on the treatment path.
Figure 2B:
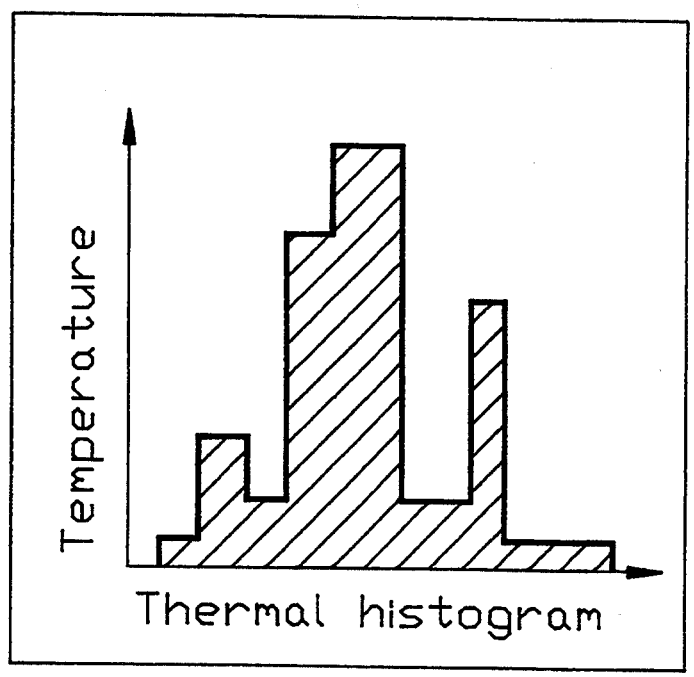
FIG. 2B is a thermal histogram across the treatment area.
Figure 3:
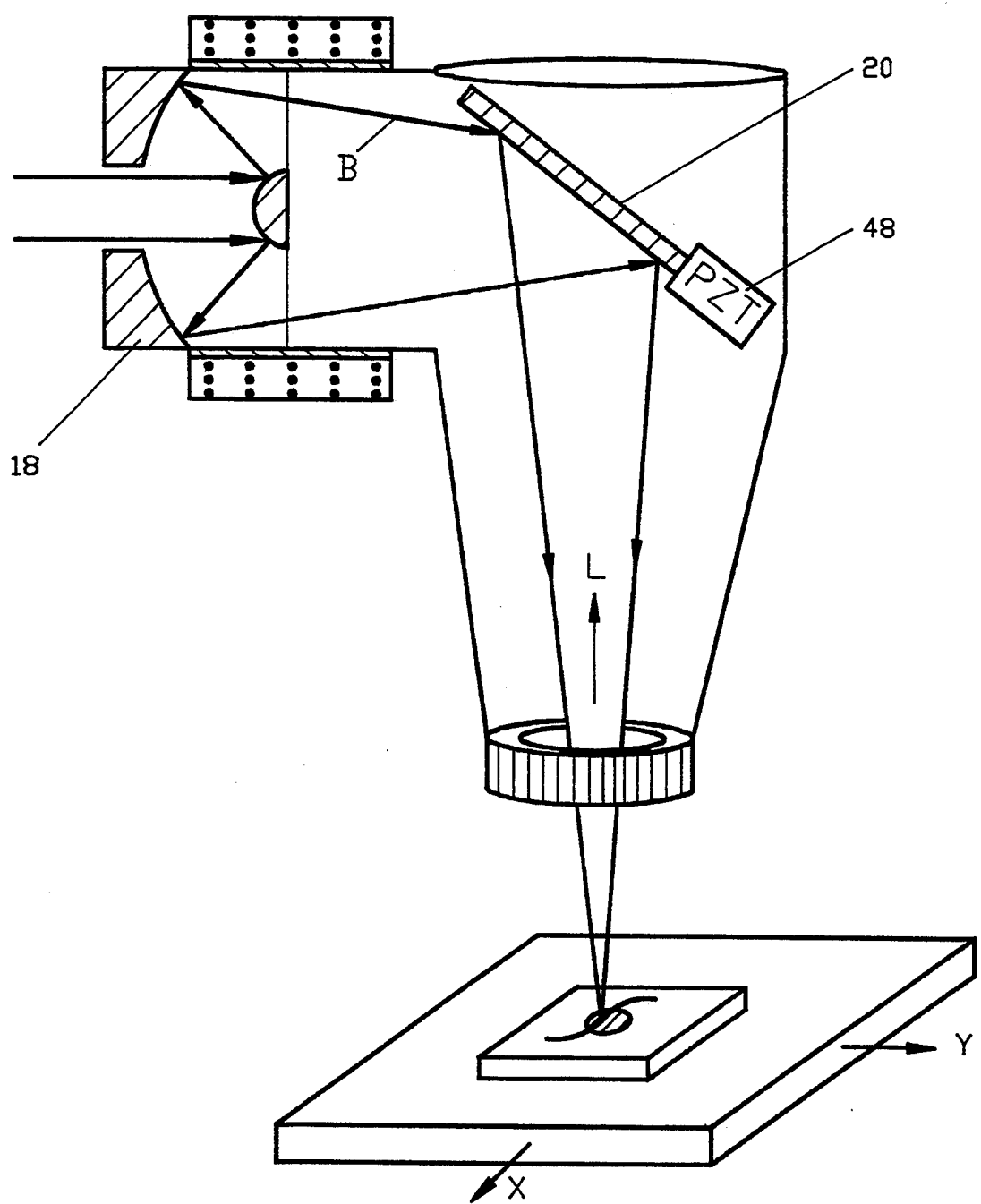
FIG. 3 is an opto-mechanical schematic view of the laser welding system of the invention with X and Y table stage.

The data processed in processing unit 38 is presented on a display unit 46 in the form of a thermal image of the type shown in FIG. 2A or in the form of a thermal histogram of the type shown in FIG. 2B. FIG. 2A illustrates a thermal path P and a position of welding spot cursor W on this path. FIG. 2 shows the distribution of temperature along path P.

A two-axis piezoelectric transducer (PZT) 48 is attached to an outer end of laser beam splitter 20 and to an external terminal 50 which is capable of controlling the positions of laser spot W on object O. This device comprises a control handle, which has two degrees of freedom and thus can provide movement of laser spot W in the plane of object O. A PZT driver 49 is located between external terminal 50 and PZT 48. A control element, e.g., a handle, of external terminal device 50 can be turned around mutually perpendicular axes, thereby moving welding spot W, through PZT 48 and PZT driver 49, in the plane of object O. Since this control device is practically the same as the so-called joys stick used in computer games, it will be further referred to as "joy stick" 50. If object O is three-dimensional, movements in the direction of a vertical axis, i.e., axis Z, can be controlled through the abovementioned zoom.

The position of laser spot W is visually observed on display 46 by tracing the position of welding spot cursor WC on path P. For precision operations, visual control can be carried out through microscope head 24.

Object O is fixed in a required position on a stationary table T, which, if necessary, may have a drive mechanism for a manual or automatic movement in a horizontal orthogonal system of X-Y axes.

All the mechanisms and elements located in FIG. 1 within a broken-line block are made as a single unit, while microscope head 24 and laser source 10 with laser controller 40 are replaceable. Of course, table T is a separate unit as well.

In a practical application, the mirror-type laser welding system of the invention will provide (for Nd:YAG laser) a welding spot having dimensions of about 10 $\mu$m.

OPERATION

The operation of the mirror-based laser system of the invention will be described with reference to a welding operation, although it is understood that the same system is applicable to fusing, cutting, engraving, perforating, and similar operations.

The system can be used most efficiently for treating an object of irregular shape in individual and small-batch production where the use of programmed universal machines is economically unjustifiable and where the laser spot should be guided along a required path manually.

An example of an object, such as object O, is shown in FIG. 1. Prior to treatment, object O is fixed to table T in a required position. An operator then focuses the objective lens of microscope head 24 to provide a sharp image of object O and switches on laser source 10 to activate the aiming beam. Using joystick 50 and viewing the area to be treated through objective lens 24, the operator places the laser spot W to a position on object O where the operation is started. Movements of joystick 50 are transmitted to laser beam splitter 20 via PZT driver 49 and piezoelectric transducer 48.

The operator activates a thermal module which consists of chopper 32, IR CCD 42, processing unit 38, and display 46, and then switches laser source 10 over to the laser treatment beam which is automatically guided to the same point as the aiming beam.

When laser treatment beam B is emitted from laser source 10, it is delivered to concave mirror 18, reflected from it to convex mirror 18, and then passes from the latter to the facing surface of laser beam splitter 20 and from there to object O where it forms welding spot W. Welding spot W heats the surrounding area. The heated area irradiates a scattered infrared light which passes through laser-beam splitter 20 a visible-light component VL and infrared-light component IL, which both have wavelengths significantly different from those of the laser beam.

If one looks at this area through microscope head 24, he/she cannot see the actual temperature distribution pattern, but rather a continuous bright spot of a large size. This temperature pattern, however, will be clearly seen on the screen of display 46, since temperatures in various points of the heated area will be detected by pixels (not shown) of IR CCD 42, converted into electrical signals, processed by processing unit 38, and presented on display 46 in the form of graphs, such as those shown in FIGS. 2A and 2B, where FIG. 2A shows the position of welding spot W on object O, and FIG. 2B shows the distribution of temperature across the area surrounding welding spot W. Such a representation facilitates the work of the operator who controls the position of point W through joystick 50 and at the same time observes this position on the scan line (FIG. 2A) and on the temperature pattern (FIG. 2B) on display 46.

If the operation has a limited depth of penetration or a limited temperature in the welding-spot area, e.g., for protecting the non-treated area from thermal damage, these parameters can be controlled through feedback loop FS which extends from the processing unit to laser controller 40. In the case the temperature between the threshold, which is stored in memory 44, and the current temperature signal detected by IR CCD, exceeds a predetermined level, a feedback signal is sent from processing unit 38 to laser controller 40, which, in turn, controls the operation of laser shutter 12 of laser source 10. As a result, laser shutter 12 doses the laser energy in a required mode. The operation is controlled on the basis of a data base which is stored in a memory unit 44 and which contains temperature characteristics for a given material and type of operation.

SUMMARY, SCOPE, AND RAMIFICATION

Thus, it has been shown that the invention provides a mirror-based laser-welding system with visual tracking and position control of the moving laser spot which is simple in construction, inexpensive to manufacture, is free of complicated filters, does not depend on high temperatures in the area of the laser spot being observed, can be used with laser beams of any wavelength, is suitable for low-energy applications and for treating low-melting-point materials such as plastics, allows precise profile treatment operations on a submicron level, and allows to obtain a thermal-distribution pattern around the area being treated.

Although the laser processing system has been shown and described in the form of one specific embodiment, this embodiment, its parts, materials, and configurations have been given only as examples, and many other modifications of the laser processing system are possible. For example, the system is suitable not only for welding, but for cutting, engraving, marking, deburring, etc. Movements of the laser spot can be carried out automatically by programmed computer, instead of joy stick 50. The output information can be presented on the display screen in a form different from that shown in FIG. 2, e.g., in a digital or a printed form.

Therefore, the scope of the invention should be determined, not by the examples given, but by the appended claims and their legal equivalents.

We claim:

1. A mirror-based laser processing system with visual tracking and controlling positions of a moving laser spot on an object, comprising:

a laser source generating a laser beam capable of treating said object;

a mirror-based micromanipulator which consists of a concave mirror and a convex mirror facing each other and spaced at a distance from each other, said concave mirror having a central hole for passing said laser beam, said convex mirror being located on the way of said beam passing through said concave mirror and reflecting said beam in a diverging manner onto said concave mirror, said concave mirror reflecting said beam in a converging manner;

a laser beam splitter which is located on the path of said beam reflected from said concave mirror add which is inclined with respect to the direction of said reflected beam, said laser beam splitter having a coating capable of passing visible and infrared light, but reflecting said laser beam onto said object, said object being located in a focusing position of said laser beam reflected from said laser beam splitter, said laser beam splitter having means for controlling its movement with respect to said beam thus moving said laser spot over said object;

an imaging beam splitter located on the side of said laser beam splitter opposite to said object and capable of transmitting a visible light but reflecting an infrared light generated by an area of said object heated by said laser spot; and an infrared tracking system for converting said infrared light into thermal information and into a visible image.

2. The mirror-based laser processing system of claim 1, wherein said mirror-based micromanipulator has a zoom system which changes said distance between said concave mirror and said convex mirror.

3. The mirror-based laser processing system of claim 1, wherein said infrared tracking system for converting said infrared light into thermal information and into a visible image comprises:

an infrared filter which passes the light corresponding only to said infrared light reflected from said heated zone and blocks said infrared laser beam;

an infrared objective lens which is located behind said infrared filter in the direction of propagation of said infrared light and which forms an infrared thermal image of said object O;

a chopper which is connected to a driver, one end of which is connected to a lock-in amplifier and which has means for converting a continuous infrared light into a discrete-pulse sequence;

an infrared charge-coupling device having means for converting said discrete-pulse sequence into electrical signals;

a processing unit which converts said electrical signal into a thermal information; and a display unit which shows said thermal information in the form of a visible image.

4. The mirror-based laser processing system of claim 3, wherein said means for controlling movements of said laser beam splitter with respect to said laser beam comprises:

a two-axis piezoelectric transducer which is attached to said laser beam splitter;

an external terminal having a control element with two degrees of freedom; and a piezoelectric-transducer driver located between said piezoelectric transducer and said external terminal, so that movements of said control elements are transmitted to said laser beam splitter and control movements of said laser beam across said object.

5. The mirror-based laser processing system of claim 1, further including a changeable microscopic head which is located on the side of said imaging beam splitter opposite to said laser beam splitter and which has means for focusing said microscopic head onto said object.

6. The mirror-based laser processing system of claim 5, further including: a memory unit which is connected to said processing unit and which stores said thermal information; and a display unit for visual presentation of said thermal information.

7. A mirror-based laser welding system with visual tracking and controlling positions of a moving welding spot on an object, comprising:

a laser source generating a laser beam capable of treating said object;

a mirror-based micromanipulator which consists of a concave mirror and a convex mirror facing each other and spaced at a distance from each other, said concave mirror having a central hole for passing said laser beam, said convex mirror being located on the way of said beam passing through said concave mirror and reflecting said beam in a diverging manner onto said concave mirror, said concave mirror reflecting said beam in a converging manner;

a laser beam splitter which is located on the path of said beam reflected from said concave mirror and which is inclined with respect to the direction of said reflected beam, said laser beam splitter having a coating capable of passing visible and infrared light, but reflecting said laser beam onto said object, said object being located in a focusing position of said laser beam reflected from said laser beam splitter, said laser beam splitter having means for controlling its movement with respect to said beam thus moving said laser spot over said object;

an imaging beam splitter located on the side of said laser beam splitter opposite to said object and capable of transmitting a visible light but reflecting an infrared light generated by an area of said object heated by said laser spot;

an infrared tracking system for converting said infrared light into thermal information and into a visible image which comprises:

an infrared filter which passes the light corresponding only to said infrared light reflected from said heated zone and blocks said infrared laser beam;

an infrared objective lens which is located behind said infrared filter in the direction of propagation of said infrared light and which forms an infrared thermal image of said object O;

a chopper which is connected to a driver one end of which is connected to a lock-in amplifier and which has means for converting a continuous infrared light into a discrete-pulse sequence;

an infrared charge-coupling device having means for converting said discrete-pulse sequence into electrical signals;

a processing unit which converts said electrical signal into a thermal information; and a display unit which shows said thermal information in the form of a visible image.

8. The mirror-based laser welding system of claim 7, wherein said mirror-based micromanipulator has a zoom system which changes said distance between said concave mirror and said convex mirror.

9. The mirror-based laser welding system of claim 8, wherein said means for controlling movements of said laser beam splitter with respect to said laser beam comprises:

a two-axis piezoelectric transducer which is attached to said laser beam splitter;

an external terminal having a control element with two degrees of freedom; and a piezoelectric-transducer driver located between said piezoelectric transducer and said external terminal, so that movements of said control elements are transmitted to said laser beam splitter and control movements of said laser beam across said object.

10. The mirror-based laser processing system of claim 9 further including: a changeable microscopic head which is located on a side of said imaging beam splitter opposite to said laser beam splitter and which has means for focusing said microscopic head onto said object; a memory unit which is connected to said processing unit and which stores said thermal information; and a display unit for visual presentation of said thermal information.

* * * * *